No. 816,937. PATENTED APR. 3, 1906.
I. A. ROMMER.
FORMING OR MOLDING DEVICE.
APPLICATION FILED MAY 17, 1904.
3 SHEETS—SHEET 2.
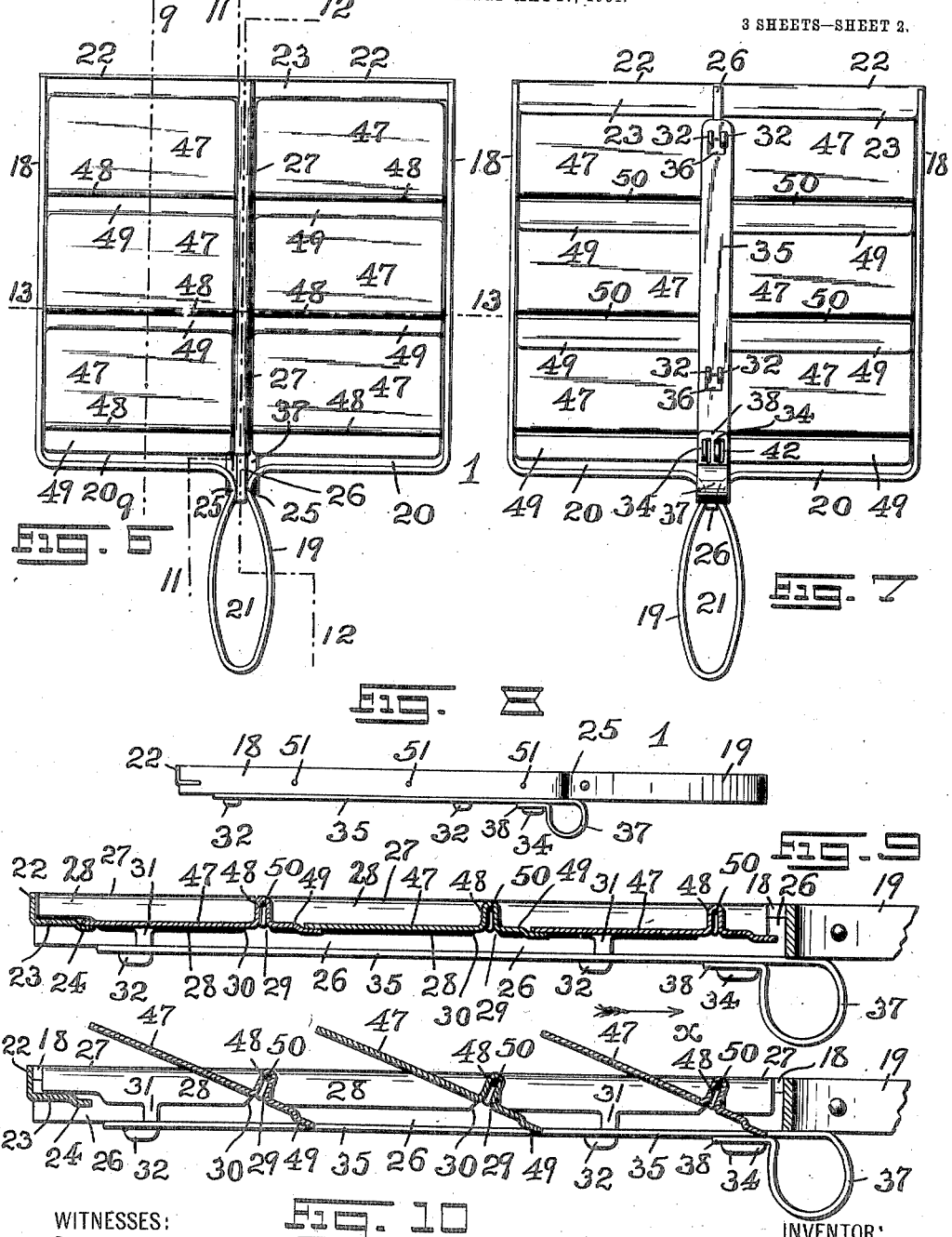

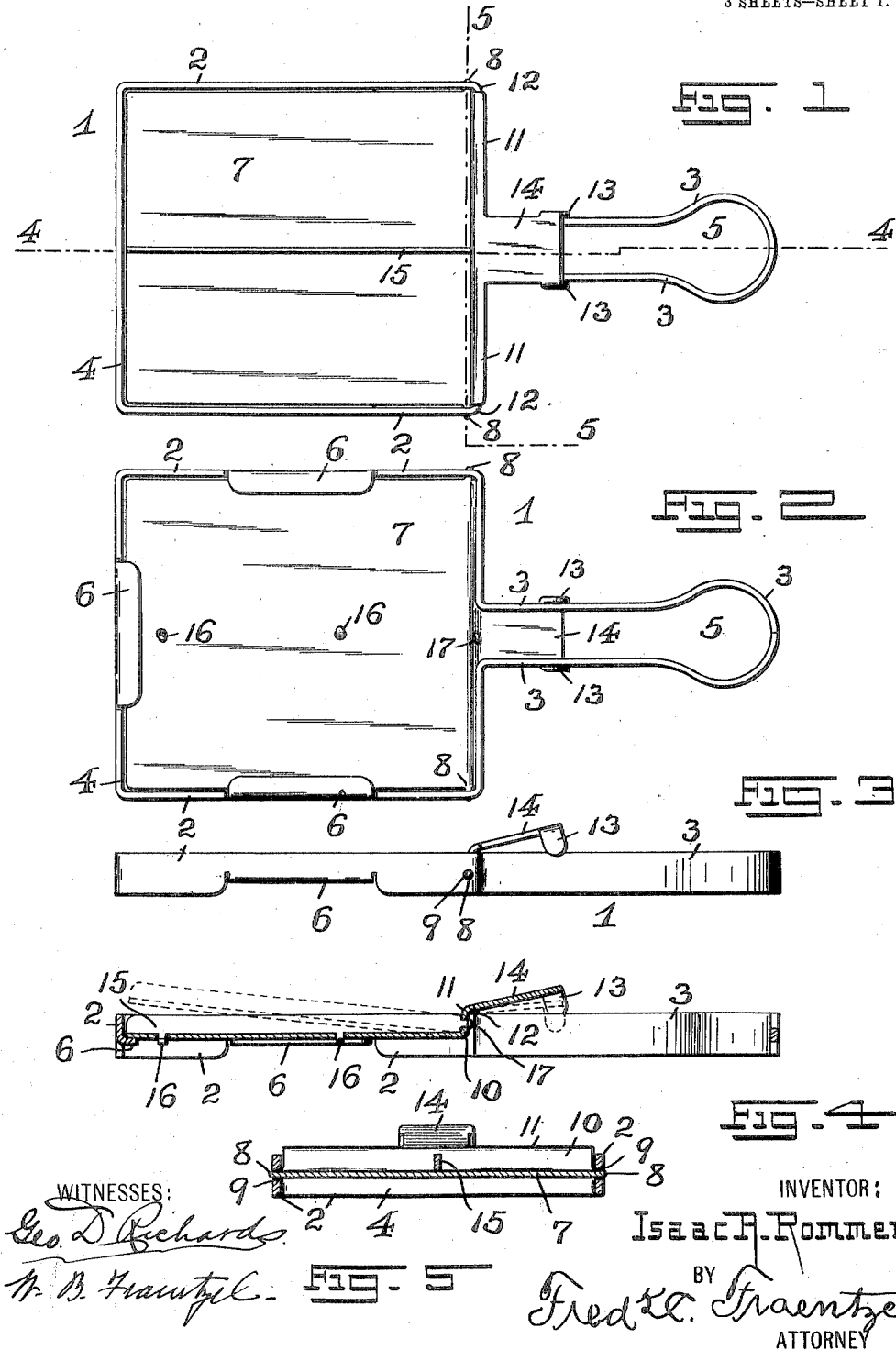

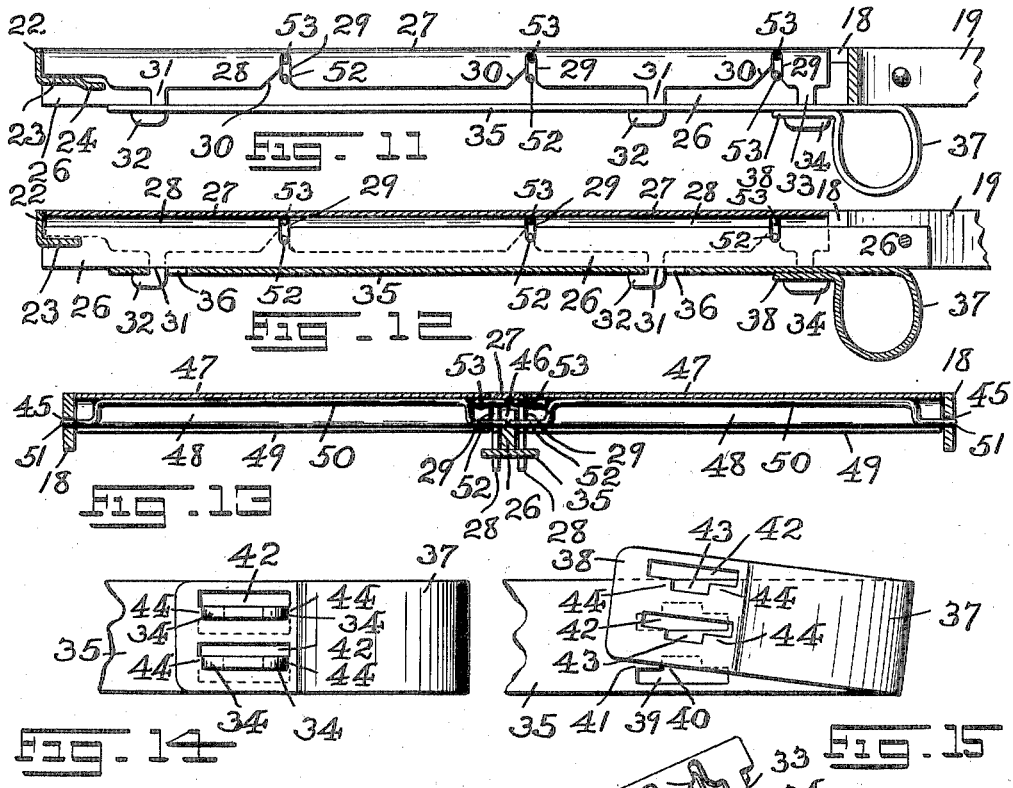

UNITED STATES PATENT OFFICE.

ISAAC A. ROMMER, OF NEWARK, NEW JERSEY, ASSIGNOR TO NATIONAL BISCUIT COMPANY, A CORPORATION OF NEW JERSEY.

FORMING OR MOLDING DEVICE.

No. 816,937.   Specification of Letters Patent.   Patented April 3, 1906.

Application filed May 17, 1904. Serial No. 208,390.

*To all whom it may concern:*

Be it known that I, ISAAC A. ROMMER, a citizen of the United States, residing at Newark, in the county of Essex and State of New Jersey, have invented certain new and useful Improvements in Forming or Molding Devices; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention relates generally to improvements in molding or forming devices or implements, and the invention has reference more particularly to a novel molding or forming implement of the general character hereinafter more particularly set forth and which is for the purpose of forming what are termed "ice-cream sandwiches," but which may be put to other various uses—as, for instance, in the forming or molding of candies, confections, cakes, and the like.

My invention has for its principal object to provide a molding or forming implement which shall be of a simple construction and which can be readily manipulated for the forming of one or more molded forms, such as ice-cream sandwiches and the like; and a further object of this invention is to provide a device or implement of the character hereinafter stated having one or more movable plates, bottoms, or leaves upon which the molded forms are made and are adapted to be raised with said movable bottoms or leaves above the surrounding edge or border of the main frame of the device or implement to permit of the removal of such molded forms with ease from each forming-compartment formed by the main frame of the device and said plates, bottoms, or leaves.

A still further object of this invention is to provide a device or implement for the purpose of producing ice-cream sandwiches and the like, the parts of the device or implement being readily separated to permit of the cleansing of the device.

Other objects of this invention not at this time more particularly specified will be clearly understood from the following detailed description of this invention.

The invention consists, primarily, in a novel forming or molding device or implement for the purposes above specified and of the character hereinafter set forth; and, furthermore, this invention consists in the various arrangements and combinations of devices and parts, as well as in the details of the construction of the same, all of which will be fully described in the following specification and then finally embodied in the clauses of the claim, which are appended to and which form an essential part of this specification.

The invention is clearly illustrated in the accompanying drawings, in which—

Figures 1 and 2 are a top and bottom view, respectively, of a molding or forming device or implement embodying the principles of my present invention; and Fig. 3 is a side view of the same. Fig. 4 is a longitudinal vertical section taken on line 4 4 in said Fig. 1, and Fig. 5 is a transverse vertical section taken on line 5 5 in said Fig. 1. Figs. 6 and 7 are a top and bottom view of a molding or forming device of a modified form of construction, but still embodying the leading features of this invention; and Fig. 8 is a side elevation of the same. Fig. 9 is a longitudinal vertical section of the device on an enlarged scale, the said section being taken on line 9 9 in said Fig. 6 and illustrating a series of movable plates or leaves in their normal initial positions for the forming thereon of ice-cream sandwiches or the like; and Fig. 10 is a similar section, but representing the said plates or leaves in their raised positions. Fig. 11 is a longitudinal vertical section taken on line 11 11 in said Fig. 6, and Fig. 12 is a similar section taken on line 12 12 in the same figure. Fig. 13 is a transverse vertical section of the device, said section being taken on line 13 13 in said Fig. 6. Figs. 14 and 15 are plan views of the locking or holding end and finger-piece portion of a slide, representing the said end portion in its locked and unlocked relation, respectively. Fig. 16 is a perspective view of a shelf-actuating bar employed with the device or implement. Fig. 17 is a similar view of the actuating-slide and its finger-piece; and Fig. 18 is a similar view of one of the detachable plates, bottoms, or leaves of the device or implement.

Similar characters of reference are employed in the above-described views to indicate corresponding parts.

In the said drawings the reference character 1 indicates the complete device or implement, Figs. 1 to 5, inclusive, representing a device provided with two forming-compartments, while the device shown in Figs. 6 to 13, inclusive, is made with six forming-compartments. I do not intend to limit my invention to any special number of such forming-compartments, for the device or implement may be made with one or more forming-compartments and correspondingly-arranged and constructed parts without in the least departing from the principles of this invention.

Referring now to Figs. 1 to 5, inclusive, the device or implement consists, essentially, of a suitably-bent frame, preferably made from band-iron or sheet metal and comprising a main body part 2, preferably of a rectangular configuration, formed with a handle 3, the said main body part 2 being provided with an intervening open space 4 and the handle having an intervening open space 5, as clearly represented in Fig. 2 of the drawings. The said main body part 2 is made at suitable intervals with supporting lips or projections 6, which extend into the said open space 4. Fitted into the said open space 4 and movably arranged therein is a plate, bottom, or leaf 7, provided with suitable pintles 8, which extend into perforations or holes 9 in the said main part 2, as illustrated, and are capable of an oscillatory motion in said perforations or holes 9. The said plate, bottom, or leaf 7 is made with an upwardly-extending marginal shoulder or projection 10, having a slightly-curved edge 11, which extends slightly above the upper edge of the portions 12 of said main body part 2. Extending rearwardly from the said curved edge 11 of the said marginal shoulder or projection 10 is a slightly upwardly inclining end piece 14, arranged above a portion of the space 5 between the handle 3 and formed with downwardly-projecting ears or lugs 13, which extend down upon the outer faces of the handle portions and are for the especial purpose of preventing any lateral spring movement of the parts of the main body 2, which would cause an accidental displacement of the leaf or plate 7 from within the space 4 of the said main body 2. The pivotal arrangement of the said leaf or plate 7 is such that in its normal initial position it will rest upon the said inwardly-extending lips or projections 6 with its finger-piece 14 in the position indicated in said Figs. 4 and 5 of the drawings. When it is desired to raise the said leaf or plate 7 above the upper marginal edge of the main frame or body 2 in the manner indicated in the dotted outline in said Fig. 4 of the drawings to remove the matter which has been formed from the said shelf or plate, pressure is applied by the operator upon the finger-piece 14 in the manner indicated, the curved edge 11 of said marginal shoulder or projection 10 by coming in contact with the upper edges of the portions 12 of the main body part 2 limiting the downward movement of the said finger-piece, and hence also limiting the upward movement of the said shelf or leaf 7, as will be clearly evident. Thus it will be seen that the surrounding frame portion of the main body 2 and the said leaf, bottom, or plate 7 will provide a suitable compartment for the forming therein of ice-cream sandwiches and other molded forms, which when molded or formed can easily be removed from the leaf or plate when the latter is raised in the manner hereinabove described. If desired, the compartment formed by the said plate of leaf 7 and the main body 2 may be divided into two compartments, as indicated in Figs. 1 and 5, by means of a partition 15, suitably secured upon the upper surface of said leaf or plate 7, preferably by means of the usual holding lugs or ears 16 and 17, which are passed through suitably-disposed perforations in the leaf or plate 7 and in the shoulder or projection 10, as clearly illustrated in Figs. 2 and 4 of the drawings.

To remove the leaf or plate 7 from its pivotal connection with the main body 2, all that is necessary is to slightly bend the finger-piece 14 in an upward direction that the lugs or ears 13 will be arranged just above the upper marginal edge of the handle 3, in which positions there is sufficient lateral spring movement of the framework to permit the forcing or springing out of the pintles 8 from the perforations 9, as will be clearly evident. After having cleaned the parts the leaf or plate 7 is readily forced back into its pivotal relation with the main body 2, and the finger-piece 14 is again bent back to its initial position.

Referring now to Figs. 6 to 18, inclusive, I have illustrated the application of my invention to a forming or molding implement provided with six forming-compartments. From an inspection of these figures it will be seen that this device consists, essentially, of a suitably-bent frame, preferably made from band-iron or sheet metal, comprising a main body part 18, preferably of a rectangular configuration, formed with a handle 19, the main part being provided with an intervening open space 20 and the handle being preferably provided with an intervening open space 21; but this is not essential. The two side members of said main body part 18 are connected by an L-shaped piece 22, forming a laterally-extending support or shelf 23, which is preferably provided with a depressed marginal edge portion, as 24, as clearly illustrated in Figs. 9, 10, and 11 of the drawings. Suitably secured at one end to the central portion of said L-shaped piece 22 and at its other end between the portions 25 at the juncture of the handle 19 with the main frame or body 18 is a central bar or rib 26, upon the upper edge of which is slidably arranged a leaf or plate actuating bar 27. This bar 27, which is more clearly represented in Fig. 16 of the drawings, is of a ⋂-shaped cross-section, so as to be fitted over the upper edge of the said bar or rib 26, as illustrated in Fig. 13 of the drawings, the said bar 27 being provided in its opposite side pieces 28 with slots 29, each slot being bounded by an inclined marginal edge 30, so that each slot is made with an enlarged open part, as shown. The said side pieces 28 are also made with downwardly-extending members 31, from which extend right-angled fingers 32, while at its one free end portion the said bar 27 has its side pieces 28 provided with downwardly-extending members 33, formed with fingers 34, which extend in opposite directions, as shown. Movably arranged against the lower edge of the said bar or rib 26 is a slide-bar 35, which is provided with suitably-disposed openings 36 and a downwardly-curved portion 37, forming a finger-piece, the latter being provided with a flat and free end portion 38. The said body portion of the slide-bar 35 is provided at suitable points near the curved portion 37 with openings 39, each opening 39 being made with an open part 40 and a pair of angular portions 41. In the end portion 38 of the said curved portion 37 are suitable openings 42, each opening 42 being made with an open part 43 and a pair of angular portions 44, substantially as illustrated in Figs. 15 and 17 of the drawings. Under normal conditions each pair of members 31 of the bar 27 extends through an opening 36 in the slide 35, with the right-angled fingers 32 arranged against the under face of the said slide 35, as clearly illustrated in Figs. 7, 9, 10, 11, and 12, and the members 33 and their fingers 34, having been forced through the oppositely-located openings 39 and 42, are then located in the open parts 40 and 43 of said openings, with the fingers 34 in holding engagement with the angular edge portions 44 of the part or member 38, as clearly illustrated in the several figures of the drawings. Referring now to Fig. 13 of the drawings, it will be seen that the side pieces of the main body 18 are made with suitably-disposed holes or perforations 45, and the said center strip, bar, or rib 26 is made with slots 46, which are in alinement with the said holes or perforations 45, as clearly illustrated. Within the open space 20, formed by the side members of the main body 18 and the central bar or rib 26, are a number of leaves or plates 47, each leaf or plate being made with an upwardly-extending and doubled-over portion 48, forming a rib or shoulder, and each leaf or plate being also provided with a depressed edge portion 49. Suitably secured in the grooved part formed in the under side of each leaf or plate 47 by the said doubled-over portion 48 is a wire 50, having the projecting ends 51 and 52 preferably bent, as illustrated in the drawings, and extending on opposite sides from each leaf or plate 47. By arranging the ends 51 in the perforations 45 and the ends 52 in the slots 46 it will be seen that said leaves or plates are pivotally secured between the side pieces of the main body 18 and the central bar or rib 26, the two plates or leaves at the end of the main body 18 farthest away from the handle portion resting upon the depressed supporting edge 24 of the part 23 of the end piece 22 and the remaining leaves or plates resting upon the depressed edge portions 49 of the various leaves or plates in the manner clearly represented in Fig. 9 of the drawings. Each plate or leaf 47 is also provided within the groove formed by the rib or doubled-over part 48 and extending therefrom at a point above the end 52 of the wire 50 with a stud or finger 53, which extends into the respective slots 29 in the respective side pieces or members 28 of the bar 27, as clearly illustrated in Figs. 11, 12, and 13, and which are for the purpose of producing the pivotal movements of the plates or leaves, the studs 53 limiting the upward movements of the said plates or leaves 47 by being brought in contact with the marginal edges 30 of the slots 29, when the device is operated in the manner to be presently described. When all the parts have in this manner been assembled in their operative positions, a pull upon the finger-piece 37 of the slide 35 in the direction of the arrow $x$ in Fig. 9 of the drawings will produce a similar movement of the bar 27 upon the rib 26, whereby each stud or finger 53 is actuated and produces a pivotal movement of each leaf or plate 47 to its raised position, (indicated in Fig. 10 of the drawings,) the ends 51 and 52 of the respective wires 50 oscillating, respectively, in the holes or perforations 45 and in the slots 46, and the enlarged lower part of each slot 29 in the members 28 of the bar 27 permitting of the sliding movement of the latter until the studs or pins 53 come in contact with the marginal edges 30, whereby the movement of said bar ceases, and the leaves or plates are held in their raised position, as will be clearly understood from an inspection of Fig. 11 of the drawings. To form one or more ice-cream sandwiches with the device, a thin cracker of the proper size is placed upon a leaf or plate 47, and the ice-cream is then spread upon the upper portion of the cracker, a second cracker then being placed upon the top of the spread ice-cream, whereby the sandwich has been produced, which can then be readily removed from the raised or tilted plate or plates 47 after the said plate or plates have been brought in such raised positions in the manner above described. Thus it will be seen that an operative device provided with a multiplicity of forming-compartments has been produced in which ice-cream sandwiches and the like can be molded or formed and readily removed from each raised plate or leaf 47 in the manner heretofore described. To separate or disconnect all the parts for cleaning purposes, the end portion 38 of the finger-piece 37 of the slide is forced slightly to one side of the members 33 of the bar 27, whereby the fingers 34 are forced from their holding engagement with the angular portions 44, and the parts can then be readily separated, as will be clearly evident.

I claim—

1. In a forming or molding device, the combination, with an open frame, said frame being provided with inwardly-extending supporting projections, of a leaf or plate within the said frame and pivotally connected at its one end within said frame, so as to be capable of an oscillatory movement in the frame, said leaf or plate forming with said frame a forming-compartment, and means for raising said leaf or plate from said supporting projections and tilting the said leaf or plate at an angle for the removal of the formed or molded matter from said leaf or plate, substantially as and for the purposes set forth.

2. In a forming or molding device, the combination, with an open frame, said frame being provided with inwardly-extending supporting projections, of a pivoted leaf or plate within the said frame and pivotally connected at its one end within said frame, so as to be capable of an oscillatory movement in the frame, said leaf or plate forming with said frame a forming-compartment, means for raising said leaf or plate from said supporting projections and tilting the said leaf or plate at an angle for the removal of the formed or molded matter from said leaf or plate, and means for limiting the upward pivotal movement of said leaf, substantially as and for the purposes set forth.

3. In a forming or molding device, the combination, with an open frame, of a supporting means extending from said frame into the opening thereof, a leaf or plate having a portion resting upon said supporting means, said leaf or plate being pivotally connected at its one end with the said frame, so as to be capable of an oscillatory movement in the frame, and forming with said frame a forming-compartment, and means for raising the said leaf or plate from said supporting means and tilting the said leaf or plate at an angle for the removal of the formed or molded matter from said leaf or plate, substantially as and for the purposes set forth.

4. In a forming or molding device, the combination, with an open frame, of a series of leaves or plates forming with said frame forming-compartments, each leaf or plate being pivotally connected at its one end within the said frame, so as to be capable of an oscillatory movement in the frame, and a leaf or plate actuating member for raising the opposite end portions of said leaves or plates from said open frame, substantially as and for the purposes set forth.

5. In a forming or molding device, the combination, with a frame, of a central and longitudinally-extending rib, a series of leaves or plates forming with said rib and frame forming-compartments, each leaf or plate being pivotally connected at its one end within the said frame, so as to be capable of an oscillatory movement in the frame, and a leaf or plate actuating member slidably arranged upon said rib, all arranged for raising the opposite end portions of said leaves or plates from said open frame, substantially as and for the purposes set forth.

6. In a molding or forming device, the combination, with a frame, of a central and longitudinally-extending rib, a series of pivoted leaves or plates forming with said rib and frame forming-compartments, each leaf or plate being pivotally connected at its one end within the said frame, so as to be capable of an oscillatory movement in the frame, and a leaf or plate actuating member slidably arranged upon said rib, all arranged for raising the opposite end portions of said leaves or plates from said open frame, substantially as and for the purposes set forth.

7. In a forming or molding device, the combination, with a frame, of a central and longitudinally-extending rib, a series of leaves or plates forming with said rib and frame forming-compartments, each leaf or plate being pivotally connected at its one end within the said frame, so as to be capable of an oscillatory movement in the frame, a leaf or plate actuating member slidably arranged upon said rib, an actuating-slide movably arranged against the under edge of said rib, and a connecting means between said slide and the leaf or plate actuating member, all arranged for raising the opposite end portions of said leaves or plates from said open frame, substantially as and for the purposes set forth.

8. In a forming or molding device, the combination, with a frame, of a central rib, a series of pivoted leaves or plates forming with said rib and frame forming-compartments, a leaf or plate actuating member slidably arranged upon said rib, an actuating-slide movably arranged against the under edge of said rib, and a connecting means between said slide and the leaf or plate actuating member, substantially as and for the purposes set forth.

9. In a forming or molding device, the combination, with a frame having pintle-receiving perforations, a plate or leaf in said frame forming with said frame a forming-compartment, pintles connected with said plate or leaf for pivotally arranging said leaf or plate in said frame, and means arranged to permit of the removal of the plate or leaf from the said frame, substantially as and for the purposes set forth.

10. In a forming or molding device, the combination, with a frame having pintle-receiving perforations, a plate or leaf in said frame forming with said frame a forming-compartment, pintles connected with said plate or leaf for pivotally arranging said plate or leaf in said frame, and a finger-piece connected with said plate or leaf arranged to permit of the removal of said plate or leaf from the said frame, substantially as and for the purposes set forth.

11. In a forming or molding device, the combination, with a frame, of a central rib, a series of pivoted leaves or plates, forming with said rib and frame forming-compartments, a leaf or plate actuating member slidably arranged upon said rib, an actuating-slide movably arranged against the under edge of said rib, a connecting means between said slide and the leaf or plate actuating member, and means connected with said slide arranged to permit of the removal of the plates or leaves from said frame, substantially as and for the purposes set forth.

12. In a forming or molding device, the combination, with a frame, of a central rib, a series of pivoted leaves or plates, forming with said rib and frame forming-compartments, a leaf or plate actuating member slidably arranged upon said rib, an actuating-slide movably arranged against the under edge of said rib, a connecting means between said slide and the leaf or plate actuating member, a finger-piece connected with said slide, and means connected with said finger-piece arranged to permit of the removal of the plates or leaves from the said frame, substantially as and for the purposes set forth.

In testimony that I claim the invention set forth above I have hereunto set my hand this 16th day of May, 1904.

ISAAC A. ROMMER.

Witnesses:
FREDK. C. FRAENTZEL,
GEO. D. RICHARDS.